April 1, 1952 — E. L. HILCHEY — 2,591,068
STUDIO BACKGROUND
Filed Aug. 30, 1948 — 2 SHEETS—SHEET 1
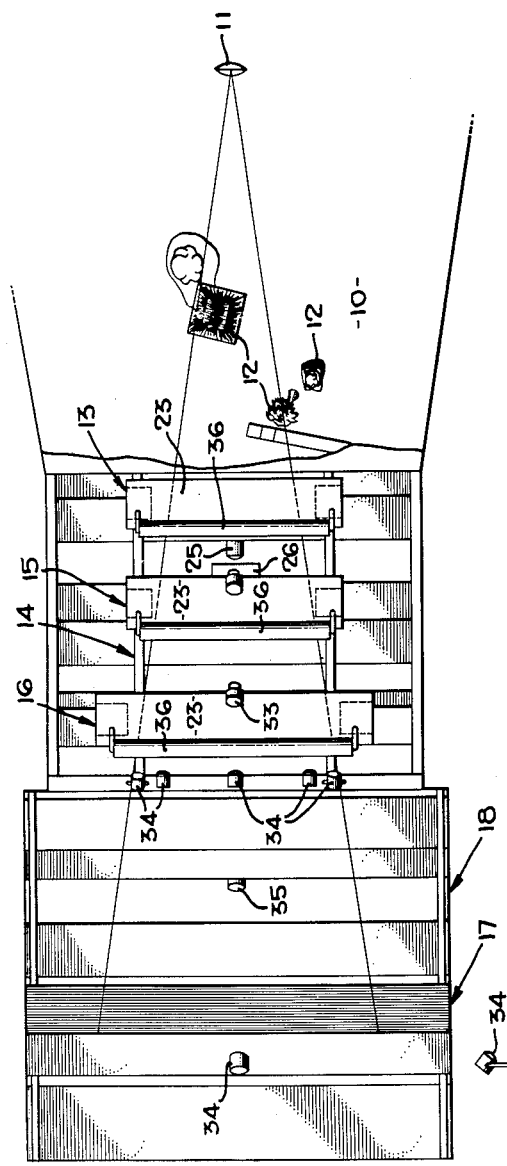
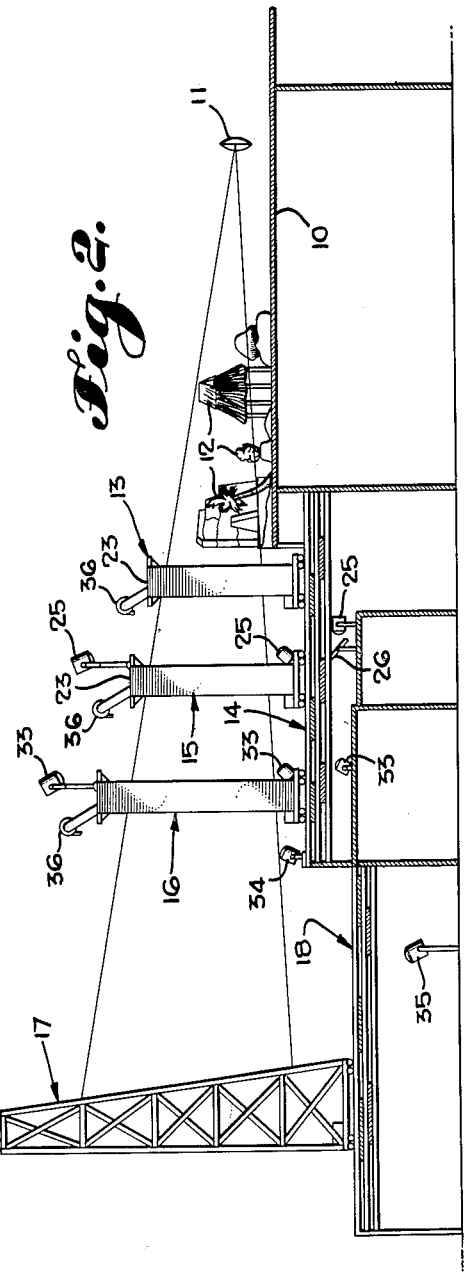
Eugene L. Hilchey,
INVENTOR.

April 1, 1952     E. L. HILCHEY     2,591,068
STUDIO BACKGROUND

Filed Aug. 30, 1948     2 SHEETS—SHEET 2

EUGENE L. HILCHEY,
INVENTOR.

BY Robert O. Fulwider
ATTORNEY

Patented Apr. 1, 1952

2,591,068

UNITED STATES PATENT OFFICE 2,591,068

STUDIO BACKGROUND

Eugene L. Hilchey, Los Angeles, Calif.

Application August 30, 1948, Serial No. 46,790

3 Claims. (Cl. 95—83)

My invention relates generally to background devices and apparatus for use in studios where cameras such as television and photographic cameras are employed, and more particularly to a background device operable to provide a much greater amount of light for the camera than has heretofore been possible.

In the making of motion pictures and more recently in the broadcasting of television programs, it is very important that a suitable background be employed whenever a scene is being viewed by a camera. In the case of interior scenes, this is generally accomplished by the building of "sets" which may obviously be constructed to indicate any desired location. However, in the case of exterior scenes, it is usually not practical, particularly in the case of television programs, to transport the actors and equipment to the various locations required by the script, and hence an artificial representation of the background must be used. In earlier times, this was accomplished by the painting of a scene upon a flat surface, much in the nature of the sets used upon the theater stage, but as the demand for realism has increased, this procedure has been found inadequate.

One solution to the problem which has recently found widespread use and popularity is the use of a translucent screen placed behind the actors, and on which a representation of the desired background is photographically projected. In this manner, it is possible to have action occurring in the background, while other action is occurring in the foreground, and the various mechanical problems involved in the synchronizing of the background projector and the viewing camera have been fairly well settled at this date. However, as the translucent projection screen is increased in area, more powerful projection lamps must be used to maintain the entire projection screen at the desired level of illumination. It has recently been proposed to synchronize two or more projectors and operate them simultaneously so that the amount of light emanating from the screen can be multiplied, but all of these methods are very costly, and are often unsatisfactory for a variety of reasons.

It has also been proposed to construct a background as a series of sheets or screens on which there are opaque representations of various objects, with the remainder of the sheet or screen being transparent to permit the viewing of other screens farther back. All of the sheets or screens, however, have been viewed by reflected light, and it is very difficult if not impossible to secure the desired results in this manner. Furthermore, if an attempt is made to project light through the sheets or screens, variations in the density or opacity of the paint become immediately apparent and give a mottled or streaked appearance which render such screens impractical.

I have found that I can overcome these various difficulties by forming sheets or screens containing various portions of the background, these screens being formed in a novel manner and lighted by a new method.

It is therefore a major object of my invention to provide a studio background for cameras designed and constructed to emanate a much greater amount of light per unit area than has heretofore been possible with previous backgrounds.

Another object of my invention is to provide a background of this type having the utmost in realism, providing both accuracy in delineation and actual separation of the various planes of the background.

It is a further object of my invention to provide such a background which lends itself very well to the production of special effects, such as the passage of clouds, which cannot readily be obtained in the desired manner in nature.

Still another object of my invention is to provide a background which is particularly adapted for use in studios, since the background may be quickly and readily changed as the occasion may demand at a very small cost compared to present backgrounds.

It is a still further object of my invention to provide an improved studio background whose pictorial representation may be changed by technicians rather than artists, and on which the work may be done in relatively small sections instead of on a single massive expanse.

These and other objects and advantages of my invention will become apparent from the following description of a preferred form thereof, and from the drawings illustrating that form in which Figure 1 is a plan view of a studio background constructed in accordance with the teachings of my present invention;

Figure 2 is a side elevational view of the device shown in Figure 1, illustrating the various planes which may be portrayed;

Figure 3:
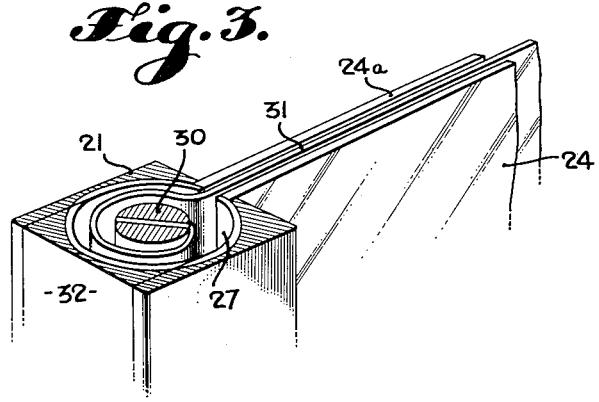
Figure 3 is a fragmentary detail, shown in perspective, of a form of construction which may be used where movement is to occur in one of the planes of the background.

Referring now to the drawings and particularly to Figs. 1 and 2 thereof, the numeral 10 indicates generally a stage or platform adapted to hold a camera indicated generally by the lens 11, and on which various foreground properties 12 may be placed where actors (not shown) may use them. Rearwardly, or away from the camera 11, is a screen 13 hereinafter described in greater detail and carrying a pictorial representation of a portion of the near background. As will be pointed out, the screen 13 is mounted on a suitable track 14 so that it may be moved backwardly and forwardly relative to the foreground properties 12, and a second screen 15 that carries a pictorial representation of the middle background is preferably also mounted on the track. A third screen 16 carries a pictorial representation of the far background, and also is preferably mounted upon the track 14 so that the relative positions of the screens 13, 15, and 16 may be shifted with respect to one another and with respect to the foreground properties 12. As will become apparent, the number of screens used may be varied to meet the requirements of the scene being viewed, but in most instances I find it desirable to provide a wall or similar member 17 which is generally of a uniform monotone representating the sky. Because the viewing angle of the camera 11 includes a greater area as the distance from the camera is increased, the screens 13, 15 and 16 will normally be progressively larger, and the wall 17 will normally have a much greater expanse than any of the screens. For this reason, the track 14 is usually not constructed to support the wall, but instead the latter is preferably supported for horizontal movement upon its own rails or tracks 18. It will be appreciated, of course, that the tracks 14 and the rails 18 are engaged by suitable rollers or wheels in a manner to prevent any lateral displacement of the screens or walls carried thereby so that safety and alignment problems are simply and easily taken care of.

To facilitate the placement of the various lights which are used to illuminate the screens 13, 15 and 16 and the wall 17, and also to take care of other miscellaneous equipment which may be necessary in the taking of a picture, I prefer to mount the various screens and wall upon a raised platform or over a pit so that adequate working space is provided beneath these various members. In this manner, the various cables and miscellaneous equipment necessary may be placed without any danger of their appearing upon the resulting picture.

Turning now to a more detailed description of the various elements of my device, it will be apparent that the stage or platform 10 may be constructed in any suitable and well-known manner, and the various foreground properties 12 built and installed in accordance with well-known practices and the requirements of the scene being pictured. In this respect, it will be realized that it has long been the practice to construct foreground properties so that they complement and blend in with other objects in the background to indicate a complete and harmonious whole.

The screen 13, except for size and other obvious differences, is similar to the screens 15 and 16, and hence while only the screen 13 will be described in some detail, it will be realized that the same features and method of construction are preferably employed in the screens 15 and 16, and any other additional screens that may be used.

Figure 4:
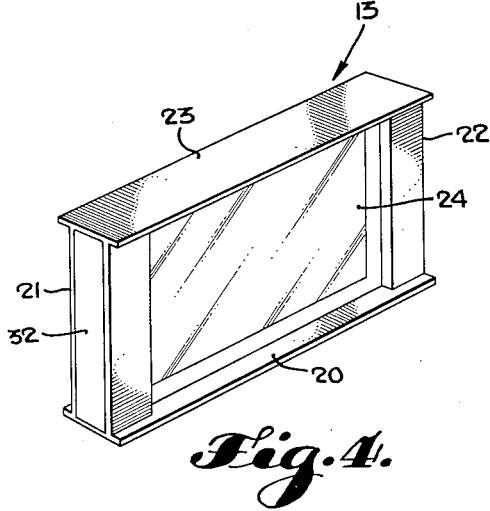
Figure 4 is a perspective view, to a reduced scale, of one of the screen mountings used in my improved background.

As indicated in Figs. 3 and 4, the screen 13 preferably includes a rigid upright framework of generally rectangular shape having a base 20 on which the wheels or rollers (not shown) that engage the track 14 are mounted, and having upright columns 21 and 22 at each end. Extending between the upper ends of the columns 21 and 22 is a generally horizontal member 23 which braces and stiffens the screen 13, and provides a platform for the mounting of lights and other equipment. While it will be apparent that conventional diagonal bracing may not be used between the columns 21 and 22, it is possible, and is a very simple matter to construct the columns of such a size and in such a manner that the framework of which they form a portion is a suitably stiff and rigid structure to withstand any of the normal loads imposed upon it.

Within the central portion of the framework formed by the base 20, columns 21 and 22, and platform 23 I mount a transparent sheet 24 of sufficient size to extend beyond the field of the camera 11 on all sides, the framework supporting the sheet thus lying outside the field of the camera and hence not being visible in the finished picture. The transparent sheet 24 may be constructed of any suitable material, and while glass is very satisfactory for smaller sizes, it will be appreciated that it is difficult if not impossible to obtain a single sheet of glass which will have the dimensions required of some of the larger sets. Since it is obviously not practical to use opaque stiffening and supporting members to carry smaller pieces of glass, it is generally preferable to form the sheet 24 of one of the transparent plastics, such plastics presently being available in a variety of thicknesses and sizes, and being capable of being joined together by cementing. In this manner, a transparent sheet 24 of any desired size may readily be constructed, and any over-lapping of adjacent sections of plastic will be substantially invisible.

In most instances, only a single sheet of plastic need be mounted in each framework, and it is upon this sheet that the pictorial representation of the desired subject is formed. To secure the most accurate delineation of a subject, it is difficult to surpass a photographic print. Such a print has the further advantage that all the portions thereof of the same color or shade have the same optical density. While this latter feature is relatively unimportant when a scene or picture is being viewed by reflected light, it becomes of great importance when the same picture is illuminated by transmitted light. Consequently, to secure the best results from my improved background, I prefer to form a photographic image of the desired subject on the sheet 24.

It will be appreciated that the size of the sheets 24 will normally be quite large, and consequently the desired image will be of the same general proportions. While photographic materials are normally not available in the enormous sizes necessary for the practice of my invention, it is possible to secure photographic emulsions which may be applied to the screen and then treated in a suitable manner to produce the desired image.

With regard to this feature, of course, it will be realized that generally only parts of the sheet 24 will carry an image, and consequently only these portions of the sheets need be coated with the emulsion. After this has been done, the desired scene may be printed by projection onto the sheet and its emulsion in a well-known manner, and the image thereafter developed and fixed.

It will be appreciated that some portions of the resulting image will be quite transparent, or have very little optical density, and consequently these portions will be relatively transparent and permit the viewing of the scene behind them. If the archway shown in Fig. 5, for example, is white, the major portion of the archway will be quite transparent and permit the clouds and mountains to be seen through the solid portions of the archway. Obviously, this is a very unnatural condition, and consequently provision must be made to render the archway apparently opaque. A simple and very satisfactory method of accomplishing this is to coat the portion of the sheet 24 carrying the image of the archway with a translucent material which will give this portion of the sheet an appearance similar to that of flashed opal glass. As an example of such a treatment, a white paint or pigment may be sprayed or otherwise uniformly applied to the rear surface of the sheet 24, thus providing a translucent light-diffusing area. While it is difficult to apply a pigment uniformly over a large area particularly where various tones and shades are being used, it is possible with a slight amount of practice to apply a very uniform coating of a single pigment, particularly where a spray gun is being used. If it is found that the coating applied in this manner lacks the desired uniformity, it is possible to take a thin sheet of light-diffusing material, such as some of the translucent white sheets or films of plastic, and apply them to the back of the sheet 24, the outline of the diffusing sheet being cut or shaped to conform to the outline of the image on the forward side of the sheet.

To provide the proper effect, the sheet 24 must be lighted by transmitted light, and to accomplish this I mount spotlights, flood lights, or other suitable forms of lighting equipment 25 behind the screen 13 to shine upon the rear surface of the latter, particularly those portions thereof which are aligned with the images on the front surface. It will be realized, of course, that it is relatively unimportant whether a few, high-intensity lights, or a multitude of low-intensity lights are used so long as the requisite amount of illumination is directed onto the sheet 24. In this manner, of course, the total amount of light directed to a given area of the sheet 24 may be greatly increased over that possible by the heretofore used methods of background projection.

The screen 15 is constructed in a manner generally similar to that of screen 13 with the exception that the former is generally somewhat larger to provide for the increased area covered by the predetermined camera angle. It will be noted that the horizontal member or platform 23 of the framework 15 provides a very suitable and convenient mounting for some of the lighting equipment 25 used in the illumination of the screen 13, though other lights may be mounted beneath the screen 13 and have their light output directed to the latter by means such as mirrors 26.

The image formed upon the sheet 24 of the screen 15 will normally be a section of the middle background that cooperates with the images formed on other sheets to produce a composite picture viewed in its entirety by the camera 11. For example, the image on the sheet 24 may be that of clouds such as is represented upon the middle view of Fig. 5. If the clouds are to remain stationary throughout the viewing of the scene, they may be formed upon the sheet 24 in the same manner that the image of the archway is formed upon the corresponding sheet of the screen 13.

However, it is sometimes necessary that the clouds or similar objects move with respect to the other objects of the background, and to meet these requirements, I have developed the improvement illustrated in Fig. 3. As illustrated in this figure, the column 21 is formed as a hollow member having a lined recess 27 therein. The sheet 24 is mounted as before, but spaced a slight distance rearwardly from this sheet is a similar sheet 24a spaced from the forward sheet 24 to provide a passageway therebetween which extends into the recess 27. The column 22 is formed in a similar manner, and a rotatable shaft 30 is mounted in each of the columns to receive a transparent sheet 31 of considerable length, and of the same width as the height of the sheet 24. An image of the clouds or other objects which are to move across the field, is formed upon the sheet 31, and a motor (not shown) drives one of the shafts 30 to wind the sheet 31 upon it and thereby cause the lateral motion of the clouds.

It will be apparent that the sheet 31 must be of a relatively flexible material, whereas the sheets 24 and 24a may be stiff or even rigid. In this way, the stiffer sheets act to restrain the sheet 31 so that the latter will not bow or buckle and thus introduce distortion into the resulting picture. Preferably, one of the stiffer sheets is mounted for easy removal so that in the event the flexible sheet 31 is not used, a stationary sheet, such as 24a, may be removed to leave only the other stationary sheet 24, thus increasing the light transmission characteristics of the screen assembly. By forming the column 21 with an access door or panel 32, the screen 31 may be easily and quickly installed, removed, or changed as the occasion may demand. The lighting of the image included within the screen assembly, however, will be the same whether only a single sheet 24 or the assembly of sheets indicated in Fig. 3 is used.

Figure 5:
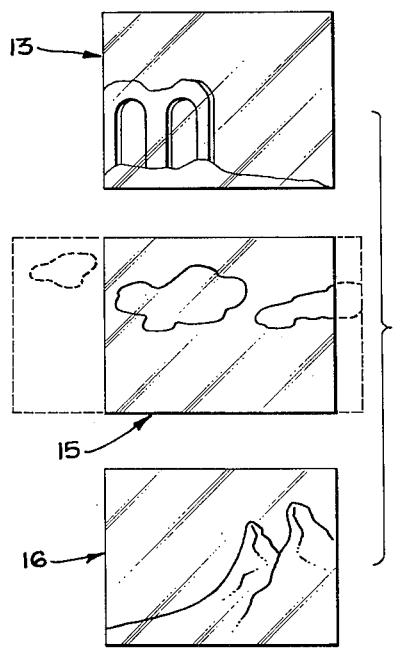
Figure 5 is a view showing the scenes on three different screens, being, respectively, the near background, the middle background, and the far background.

The length of the sheet 31 will normally be determined by the amount of movement of the image carried thereby that is to take place during the viewing of a scene. Obviously, the more movement which is required, the greater the length of the sheet 31. Consequently, if the clouds indicated in Fig. 5 are to move across the field, the sheet 31 will include the portion shown in solid outline in Fig. 5, plus the additional amount indicated in dotted outine. This, of course, is by way of example only.

While the need seldom arises in conjunction with the screen 13, I prefer to construct this screen so that it likewise may have the movable sheet 31 installed therein, thereby providing increased flexibility and adaptability of my improved studio background. In a similar manner, the screen 16 is constructed in a manner similar to that employed in the construction of screens 13 and 15, with the exception that the screen 16 is usually bigger to provide for the diverging camera angle, as previously mentioned. The screens 15 and 16 are lighted from the rear by lamps 33 and 34, respectively, it being understood that the lamps and other lighting equipment shown are merely representative of any desired style and number of light sources.

Located rearwardly of the screen 16 is the wall 17, previously mentioned, which normally will be designed to indicate clear sky in the case of exterior views. Consequently, this wall 17 will normally be a single uniform color throughout its area, and is viewed by reflected light. It would be possible, of course, to construct the wall 17 so that it is a translucent member illuminated by transmitted light, but it is usually more practical to paint the wall a uniform shade of white or light blue and secure any desired variations in intensity or color by variations in the sources of light.

In this connection, it will be realized that the light directed upon the various screens 13, 15 and 16 and the wall 17 may be modified by suitable color screens placed in front of the respective light sources so that weird and unusual effects may be produced. This is especially effective when the images formed upon the various screens 13, 15 and 16 are themselves in color, which can be accomplished by the provision of suitable emulsions upon the screens and the proper treatment of those emulsions. In a similar manner, the wall 17 may first be illuminated with a reddish or orange color near the lower edge thereof, the light gradually moving up the wall and changing to a white or bluish color, thus giving the impression of a sunrise, while the reverse operation will give the effect of a sunset. For this purpose, a series of lights 35 may be located beneath the rails 18 carrying the wall 17, the lights being suitably operated by technicians either positioned at the lights or controlling the latter from a remote location.

Figure 6:
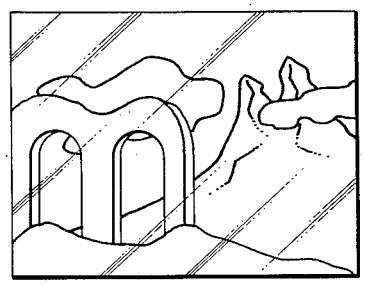
Figure 6 is the resulting scene as viewed by the camera when looking at the screens shown in Figure 5.

Continuing the exemplification of a scene which is to be viewed by the camera 11, the screen 16 may carry the image of mountain peaks thereon as indicated in the lowermost view of Fig. 5. When the three separate images indicated in this figure are then combined in the manner described, the resulting scene will have the general appearance indicated in Fig. 6, where the archway is carried by the screen 13, the slowly drifting or stationary clouds carried by the screen 15, and the mountain peaks are on the screen 16. The wall 17 indicates the sky, and is visible beyond the mountain peaks and clouds, and behind the archway. Because of the much greater amount of light which may be projected onto each of the screens 13, 15 and 16, much more brilliantly lighted images are possible, and hence most of the problems of background projection are eliminated.

In some instances, it is unnecessary and even undesirable that the total number of screens available be used. An example might be found in the case where certain action was to occur before the archway indicated in Figs. 5 and 6, a portion of this action occurring with the mountains in the background being clearly visible, while another portion of the action occurs with the mountains and all other intermediate objects blanketed with fog or clouds. Under such circumstances, the mountains must be eliminated or rendered invisible, while still retaining their same relative position. While this may be done by providing the sheet 31 of the screen 15 with a translucent, light-diffusing area of a size to completely cover the aperture in the framework of the screen, the same result may be achieved by an auxiliary screen provided for just such occasions. Since the need for such a screen arises rather frequently, I have found it desirable to provide each of the screens 13 and 15, and occasionally screen 16, with a completely translucent light-diffusing sheet that may quickly and easily be moved to cover the image-carrying sheet 24 of the corresponding screen. In some instances, a sheet of cloth will produce the desired results, but in keeping with the materials used in constructing the remainder of the improved studio background, I prefer to form this sheet of a white translucent, light-diffusing plastic which may be rolled upon a shaft. In Figs. 1 and 2, I have indicated this sheet by the numeral 36, and have shown it mounted upon the upper member or platform 23 of the various screens 13, 15 and 16. When the screen 36 is used, it will be illuminated by the light in back of it, and viewed by transmitted light. The screens and wall 17 behind the lowered sheet 36 need not be illuminated under these circumstances, since the added illumination they provide will normally be unnecessary.

While it is believed that the use of my improved studio background will largely eliminate the need for background or rear projection, where circumstances indicate that this process is desirable, my improved background lends itself very well to this use. Under these conditions, it is only necessary to cover the desired portion of one of the screens with a translucent coating similar to that applied to the back of an image, and project the desired image onto this coating. The use of background projection or rear projection under such circumstances is usually superior to the results presently obtained since only a relatively small area of the total field will need to be covered by such rear projection, and consequently there are fewer problems involved in securing the necessary amount of light. In this connection, it will be appreciated that other "process shots" may be employed in conjunction with my improved studio background, such as the so-called "matte shots," "glass shots" and other photographic tricks and devices.

In a similar manner, it will be seen that similar photographic processes and tricks may be used to form the images upon the various screens 13, 15 and 16, and the screens themselves may be raised, lowered, tilted, or moved sideways to produce different desired effects.

These and other modifications and arrangements of the various elements will be immediately apparent to those skilled in the art, and are thought to be clearly within the scope of invention defined herein. Consequently, I do not wish to be restricted to the particular form or arrangement of parts herein described and shown except as limited by my claims.

I claim:

1. A studio background of the class described which includes: a support for a camera; a first framework having an unobstructed aperture therethrough; a first transparent screen supported by said framework in said aperture; a photographic image on said screen; a light diffusing coating on said screen aligned with said image and co-extensive therewith; rails supporting said framework for movement toward and away from said camera; a second framework supported by said rails for movement toward and away from said camera independently of said first framework, said second framework having a unobstructed aperture therethrough aligned with said aperture of said first framework and in the field of said camera; a second transparent screen supported by said second framework in said aperture thereof; a third transparent screen supported by said second framework in said aperture thereof, aligned with said second screen and parallel thereto, but spaced a small distance therefrom; a flexible transparent screen carried by said second framework for movement between said second and third transparent screens while being at least partially supported by the latter; a generally translucent, light diffusing image on at least one of said screens supported by said second framework, said last image cooperating with said photographic image to produce a composite image, as viewed by said camera, having the appearance of depth; a translucent light diffusing screen mounted on said second framework for placement in or removal from a position behind said second and third transparent screens; and lighting means for independently projecting light onto said images carried by said first and second frameworks for viewing both of said images by light transmitted therethrough, toward said camera.

2. A studio background of the class described which includes: a support for a camera; a first framework supported for movement toward or away from said camera and having an unobstructed aperture therethrough; a first transparent screen supported by said framework in said aperture; a photographic image on said screen; a light-diffusing coating on said screen aligned with said image and coextensive therewith, said image and said coating covering a portion of said screen, the remainder thereof being transparent; a second framework supported for movement toward or away from said camera independently of said first framework, said second framework having an unobstructed aperture therethrough aligned with said aperture of said first framework and in the field of said camera; a second transparent screen supported by said second framework in said aperture thereof; a third transparent screen supported by said second framework in said aperture thereof, aligned with said second screen and parallel thereto but spaced a small distance therefrom; a flexible transparent screen carried by said second framework for movement between said second and third transparent screens while being at least partially supported by the latter; a generally translucent, light-diffusing image on at least one of said screens supported by said second framework, said last-mentioned image being at least partially aligned with said transparent area of said first screen to produce, with said photographic image, a composite image having the appearance of depth as viewed by said camera; a translucent light-diffusing screen mounted on said second framework for placement in or removal from a position behind said second and third transparent screens; and lighting means for independently projecting light onto said images carried by said first and second framework for simultaneously viewing both of said images by light transmitted therethrough, toward said camera.

3. A studio background of the class described which includes: a support for a camera; a first framework supported for movement toward or away from said camera and having an unobstructed aperture therethrough; a first transparent screen supported by said framework in said aperture; a photographic image on said screen; a light-diffusing coating on said screen aligned with said image and coextensive therewith, said image and said coating covering a portion of said screen, the remainder thereof being transparent; a second framework supported for movement toward or away from said camera independently of said first framework, said second framework having an unobstructed aperture therethrough aligned with said aperture of said first framework and in the field of said camera; a second transparent screen supported by said second framework in said aperture thereof; a third transparent screen supported by said second framework in said aperture thereof, aligned with said second screen and parallel thereto but spaced a small distance therefrom; a flexible transparent screen carried by said second framework for movement between said second and third transparent screens while being at least partially supported by the latter; a generally translucent, light-diffusing image on at least one of said screens supported by said second framework, said last-mentioned image being at least partially aligned with said transparent area of said first screen to produce, with said photographic image, a composite image having the appearance of depth as viewed by said camera; and lighting means for independently projecting light onto said images carried by said first and second frameworks for simultaneously viewing both of said images by light transmitted therethrough, toward said camera.

EUGENE L. HILCHEY.

REFERENCES CITED

The following references are of record in the file of this patent:

UNITED STATES PATENTS

| Number | Name | Date |
| --- | --- | --- |
| 1,479,939 | Sulzer | Jan. 8, 1924 |
| 1,597,727 | Desperati | Aug. 31, 1926 |
| 1,742,680 | Artigue | Jan. 7, 1930 |
| 2,028,863 | Briel | Jan. 28, 1936 |
| 2,053,317 | Billing | Sept. 8, 1936 |
| 2,054,414 | Fleischer | Sept. 15, 1936 |
| 2,075,684 | Whitman | Mar. 30, 1937 |